US 6,608,648 B1

(12) United States Patent
Bean

(10) Patent No.: US 6,608,648 B1
(45) Date of Patent: Aug. 19, 2003

(54) DIGITAL CAMERA CURSOR CONTROL BY SENSING FINGER POSITION ON LENS CAP

(75) Inventor: Heather N. Bean, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/425,323

(22) Filed: Oct. 21, 1999

(51) Int. Cl.[7] ................ H04N 5/232; H04N 5/222; H04N 5/225; G09G 5/00
(52) U.S. Cl. ............... 348/211.7; 348/333.01; 348/375; 345/856; 345/176
(58) Field of Search .............. 348/141, 211.7, 348/333.01–333.13, 207.99, 375; 345/856, 6, 173–177; 178/6

(56) References Cited

U.S. PATENT DOCUMENTS

| | | | | |
|---|---|---|---|---|
| 5,673,041 A | * | 9/1997 | Chatigny et al. | 341/22 |
| 5,917,599 A | * | 6/1999 | Nishikawa et al. | 356/510 |
| 6,122,003 A | * | 9/2000 | Anderson | 348/207.99 |
| 6,166,370 A | * | 12/2000 | Sayag | 250/221 |
| 6,278,443 B1 | * | 8/2001 | Amro et al. | 345/173 |
| 6,326,564 B1 | * | 12/2001 | Komatsu et al. | 178/18.01 |
| 6,498,628 B2 | * | 12/2002 | Iwamura | 348/734 |
| 6,538,663 B2 | * | 3/2003 | Kamei | 345/635 |
| 6,545,670 B1 | * | 4/2003 | Pryor | 345/173 |

* cited by examiner

*Primary Examiner*—Wendy R. Garber
*Assistant Examiner*—Lin Ye
(74) *Attorney, Agent, or Firm*—Augustus W. Winfield

(57) ABSTRACT

An array of photosensors, used for imaging in a digital camera, is used to detect pressure, for example pressing by a finger, on an attached lens cap. The location of the pressure may be used to directly position a cursor, or the location of the pressure may be used to control direction of movement of a cursor. The lens cap is designed so that pressure on an outer layer changes reflectance or color of an area on an inner layer. For example, an inner layer may be translucent and dark and separated by a gap from a light colored outer layer. When the outer layer is pressed against the inner layer, the area of contact has an increased reflectance. Alternatively, the inner layer may be transparent, and a colored liquid may separate the inner layer from a light colored outer layer. When the outer layer is pressed against the inner layer, the area where all the liquid is displaced has the color of the outer layer.

10 Claims, 2 Drawing Sheets

DIGITAL CAMERA CURSOR CONTROL BY SENSING FINGER POSITION ON LENS CAP

FIELD OF INVENTION

This invention relates generally digital cameras to and more specifically to a device used to control a cursor position on a display on a digital camera.

BACKGROUND OF THE INVENTION

Digital still cameras and digital video cameras often include a multipurpose display on the back of the camera. The display may be used to show one or more images, or the display may be used for various control functions. For example, multiple reduced size ("thumbnail") images may be arranged on the display so that a camera operator may select an image for viewing, or for transmission to a storage device or computer. Alternatively, a camera may include various image editing functions, so that areas of an image need to be selected for editing. Alternatively, the display may present a menu of camera control functions, and the camera operator may need to scroll through and select various control choices. Typically, selection of one image from an array of images, or defining an area for editing, or selection of one choice from a menu of items, requires movement of a cursor over the image or menu item to be selected, followed by pressing a key or button to initiate the selection. In general, just as cursors are controlled for computer displays, a cursor in a digital camera may be controlled, for example, by a mouse, up/down control buttons, levers ("joystick"), a track-ball, rocking platform switches, or touch sensitive pads that track finger movement. However, each of these cursor control devices require extra parts, and require space on the surface of the camera or appendages to the camera. In addition, some devices requiring discrete movements, such as rocker switches, may be less intuitive to an operator compared to devices that use continuous movement, such as a mouse, which people are accustomed to using with computer displays. Small cameras may have very limited space for controls. There is a need for simple low-cost cursor control, with continuous control similar to use of a mouse, without requiring devices that consume space on the surface of the camera.

SUMMARY OF THE INVENTION

The array of photosensors used for imaging is used to detect pressure, for example pressing by a finger, on an attached lens cap. The location of the pressure may be used to directly position a cursor, or the location of the pressure may be used to control direction of movement of a cursor. As a result, using the lens cap for cursor control closely mimics touch pad pointing devices, providing continuous position or motion control. The lens cap, for example, may comprise two layers that are separated. The inside layer may be a rigid, translucent, dark colored material. The outer layer may be flexible and light colored. When the outer layer is pressed against the inner layer, the reflectance on the inner surface at the point of contact with the light material becomes much higher than the reflectance where there is no contact with the light colored material. Alternatively, the lens may enclose a liquid so that the color normally seen by the array of photosensors is the color of the liquid. Then, when the outer layer of the lens cap is depressed, a small area of the outer layer displaces the liquid and touches the inner layer, so that the a color of the small area seen by the array of photosensors is the color of the outer layer of the lens cap. Alternatively, thermally sensitive materials may be used, so that the lens cap changes color in an area pressed by a relatively warm finger.

DETAILED DESCRIPTION OF THE PREFERRED EMBODIMENT OF THE INVENTION

Figure 1:
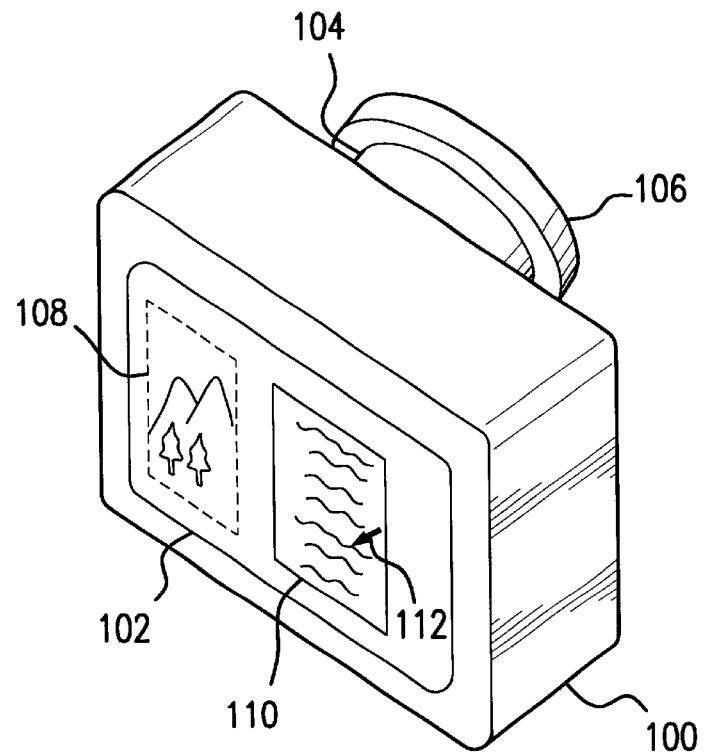
FIG. 1 is a perspective view of a camera in accordance with the invention.

FIG. 1 illustrates an example of a digital still camera in accordance with the invention. The invention is equally applicable to digital video cameras. In FIG. 1, a camera 100 has a display 102 on the back. In addition, the camera has a lens 104, covered by a removable lens cap 106. In FIG. 1, the display 102 is presenting an image 108 that has been captured earlier. The display 102 also is presenting a control menu 110, with a list of choices, for example, to delete or store the image, or to crop or otherwise resize the image, or to provide other editing functions. Also illustrated on display 102 is an image of a moveable cursor 112 used to select items being presented, in this example one of the control menu items.

Figure 2:
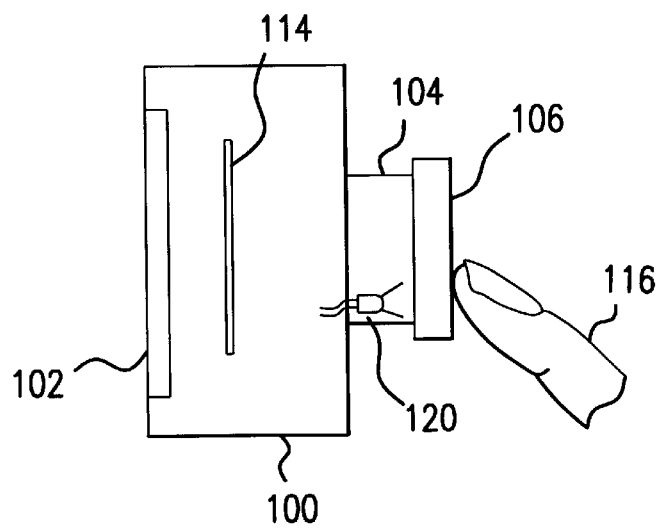
FIG. 2 is a cutaway side view of the camera of FIG. 1.

As illustrated in FIG. 2, the camera 100 also has a array of photosensors 114, used to capture images. Images are focused by the lens 104 onto the array of photosensors 114 and electronic charges from the photosensors are shifted into analog-to-digital converters (not illustrated), and resulting digital values are stored in a memory (not illustrated). The camera also includes a processor (not illustrated) that controls imaging and storage, and controls the display 102. In FIG. 2, the lens cap 106 is attached (it is removed for image capture) and a finger 116 is pressing on the lens cap 106 to control the cursor 112 (FIG. 1) on the display 102. Also illustrated in FIG. 2 is a light 120, used to illuminate the back of the lens cap 106, so that if the lens cap 106 is opaque, the light 120 enables the array of photosensors 114 to image the back of the lens cap.

Figure 3:
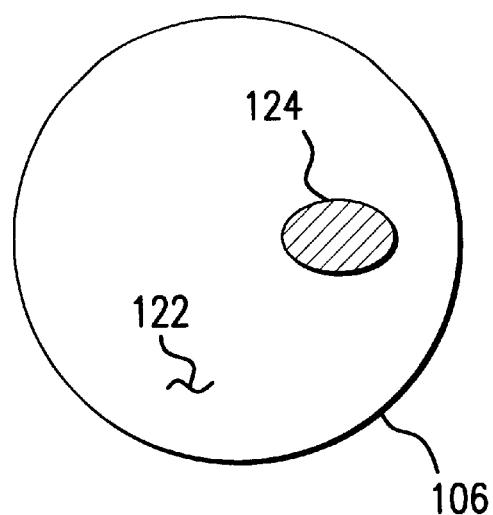
FIG. 3 is a view of the inside of the lens cap illustrated in FIGS. 1 and 2.

FIG. 3 illustrates the back 122 of the lens cap 106, as viewed by the array of photosensors 114 (FIG. 2). In FIG. 3, most of the back of the lens cap 106 is, for example, a light color. Where pressure is applied to the front of the lens cap, an area 124 is a dark color. The choice of light and dark is arbitrary and for illustration only. The only important parameter is that the processor in the camera must be able to distinguish, in an image of the back 122, digital intensity or color values in an image representing the area 124 from digital intensity or color values representing the rest of the back 122.

Figure 4:
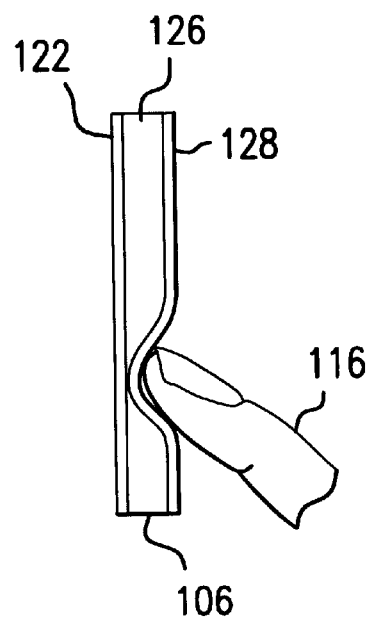
FIG. 4 is an expanded cutaway side view of the lens cap illustrating one example embodiment.

FIG. 4 illustrates one example of a lens cap that provides a color change in an area that is pressed. In FIG. 4, the lens cap has an inner layer 122, a gap 126, and an outer layer 128. For example, the inner layer 122 may be rigid, translucent, and dark colored. The outer layer 128 may be flexible and light colored. When the outer layer is pressed against the inner layer, the reflectance of the inner layer is increased in the area of contact. As an alternative, the gap 126 may be filled with a liquid and the liquid may be colored, for example, blue. The inner layer may be transparent and the outer layer may again be white. If the outer layer is not pressed, then the photosensor array images only blue. If the outer layer 128 is deflected so that the outer layer 128 touches the transparent inner layer 122, then the photosensor array images the color of the outer layer (white in the example) in the area where the liquid 126 is completely displaced. A suitable example material for the outer layer 128 is polyvinyl chloride, which is flexible and available in many colors.

As an alternative to the multilayer configuration of FIG. 4, the lens cap may be fabricated from a material that changes color when heated. Pressing a finger onto the material then causes a local color change. If the material is sufficiently thin, the color change will be visible on both sides of the lens.

When the lens cap is covering the lens and the camera is being controlled, the array of photosensors images the back of the lens cap, and the resulting digital image pixels may be associated with individual pixels in the display 102. The processor may place the cursor 124 at an X,Y location in the display defined by a geometric attribute of the area 124. For example, the X extent and Y extent of area 124 may be determined and a center point may be defined as the center of the X and Y extents. Alternatively, the center point of the area 124 (or any other point consistently defined by the area 124) may define a direction of movement of the cursor. That is, the center point of area 124 relative to a reference point (for example, a point corresponding to the center point of display 102) defines a direction, and the processor may move the cursor slowly in that relative direction. Motion is stopped by simply removing the pressure. A button or switch (not illustrated) on the camera may be used as the functional equivalent of a mouse button to initiate selection.

Note that it is not necessary to focus onto the interior surface of the lens cap. That is, a defocused spot is still adequate for cursor control. Note also that there are many variations of lens caps, so that the lens cap may be, for example, a sliding door, or flip-up door over a retracted lens.

In summary, the invention provides cursor control with continuous control. The lens cap is a separate replaceable unit that does not require any electrical or mechanical coupling to the camera. The only additional part required, other than the lens cap, is a light for interior illumination. Depending on the display technology, or the display technology used in a viewfinder, a light may already be present for back lighting a display, and the light may also be used to illuminate the back of the lens cap.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A digital camera comprising:
an array of photosensors;
a lens; and
a cap adapted to cover the lens, the cap having an interior side and an exterior side, the interior side being viewable by the array of photosensors when the cap is covering the lens, the interior side having a first reflectance when no pressure is placed onto the exterior side, wherein pressure on the exterior side causes an area of the interior side to change to a second reflectance, the second reflectance not equal to the first reflectance.

2. The camera of claim 1, further comprising:
a display, the display adapted to present a cursor; and
the area having the second reflectance being used to control a position of the cursor on the display.

3. The camera of claim 1, further comprising:
a display, the display adapted to present a cursor; and
the area having the second reflectance being used to control a direction of motion of the cursor on the display.

4. A digital camera comprising:
an array of photosensors;
a lens; and
a cap adapted to cover the lens, the cap having an interior side and an exterior side, the interior side being viewable by the array of photosensors when the cap is covering the lens, the interior side having a first color when no pressure is placed onto the exterior side, wherein pressure on the exterior side causes an area of the interior side to change to a second color, the second color not equal to the first color.

5. The camera of claim 4, further comprising:
a display, the display adapted to present a cursor; and
the area having the second color being used to control a position of the cursor on the display.

6. The camera of claim 4, further comprising:.
a display, the display adapted to present a cursor; and
the area having the second color being used to control a direction of motion of the cursor on the display.

7. A method of controlling position of a cursor on a display on a camera, the method comprising the following steps:
pressing onto an exterior surface of a lens cap, thereby causing an area in the interior of the lens cap to change reflectance;
imaging, by an array of photosensors, the interior of the lens cap; and
moving the cursor to a position on the display that corresponds to the position, within the image of the interior of the lens cap, of the area having a changed reflectance.

8. A method of controlling position of a cursor on a display on a camera, the method comprising the following steps:
pressing onto an exterior surface of a lens cap, thereby causing an area in the interior of the lens cap to change color;
imaging, by an array of photosensors, the interior of the lens cap; and
moving the cursor to a position on the display that corresponds to the position, within the image of the interior of the lens cap, of the area having a changed color.

9. A method of controlling motion of a cursor on a display on a camera, the method comprising the following steps:
pressing onto an exterior surface of a lens cap, thereby causing an area in the interior of the lens cap to change reflectance;

imaging, by an array of photosensors, the interior of the lens cap; and moving the cursor on the display in a direction that corresponds to a direction defined by a position, within the image of the interior of the lens cap, of the area having a changed reflectance, relative to a reference position.

10. A method of controlling motion of a cursor on a display on a camera, the method comprising the following steps:

pressing onto an exterior surface of a lens cap, thereby causing an area in the interior of the lens cap to change color;

imaging, by an array of photosensors, the interior of the lens cap; and moving the cursor on the display in a direction that corresponds to a direction defined by a position, within the image of the interior of the lens cap, of the area having a changed color, relative to a reference position.

* * * * *